United States Patent
Briot et al.

(10) Patent No.: US 7,635,424 B2
(45) Date of Patent: Dec. 22, 2009

(54) METHOD OF CAPTURING MERCAPTANS CONTAINED IN A NATURAL GAS BY CONCENTRATION

(75) Inventors: Patrick Briot, Pommier de Beaurepaire (FR); Renaud Cadours, Francheville (FR); Sophie Drozdz, Lyons (FR); Fabrice Lecomte, Paris (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 308 days.

(21) Appl. No.: 11/625,935

(22) Filed: Jan. 23, 2007

(65) Prior Publication Data

US 2007/0193925 A1 Aug. 23, 2007

(30) Foreign Application Priority Data

Jan. 24, 2006 (FR) .................................. 06 00643

(51) Int. Cl.
*C10G 45/04* (2006.01)
(52) U.S. Cl. ................ 208/208 R; 208/213; 208/250; 423/242.1; 423/658.5; 95/93; 95/141; 95/143; 568/18; 568/38; 568/59; 568/60
(58) Field of Classification Search ............ 208/208 R; 423/242.1, 658.5; 95/93, 141, 143; 568/18, 568/38, 59, 60
See application file for complete search history.

(56) References Cited

U.S. PATENT DOCUMENTS

| | | | | |
|---|---|---|---|---|
| 3,803,259 A | * | 4/1974 | Porchey et al. ............. 585/653 |
| 4,775,462 A | * | 10/1988 | Imai et al. ................... 208/189 |
| 4,830,733 A | * | 5/1989 | Nagji et al. ............. 208/208 R |
| 5,417,946 A | | 5/1995 | Chou et al. |
| 5,463,134 A | * | 10/1995 | Frey ........................... 568/59 |
| 5,659,109 A | * | 8/1997 | Fernandez de la Vega et al. ........................ 585/834 |
| 6,472,354 B2 | * | 10/2002 | Luyendijk et al. .......... 508/324 |

FOREIGN PATENT DOCUMENTS

| | | |
|---|---|---|
| FR | 2861403 | 4/2005 |
| FR | 2868962 | 10/2005 |
| FR | 2873711 | 2/2006 |
| FR | 2882941 | 9/2006 |

OTHER PUBLICATIONS

Griesbaum, K. (1970). Angew. Chem. Internat. Edit., 9,4, 273-287.*
Babich I V et al: Science and technology of novel processes for deep desulfurization of oil refibery streams: Fuel, IPC Science and Technology Press Guildford, vol. 82, No. 6 Apr. 2003.
International Search Report.

* cited by examiner

*Primary Examiner*—Robert J Hill, Jr.
*Assistant Examiner*—Brian McCaig
(74) *Attorney, Agent, or Firm*—Antonelli, Terry, Stout & Kraus, LLP.

(57) ABSTRACT

The mercaptan-laden natural gas is contacted with a mercaptan-adsorbing sieve T1. The mercaptan-rich gaseous effluent obtained upon regeneration of sieve T2 is then contacted with an olefin-containing liquid feed in the presence of an acid catalyst. Under suitable conditions, the mercaptans are absorbed in the liquid feed and they react with the olefins so as to form solvent-soluble sulfides. A solvent regeneration stage allows the capture agent to be recycled.

14 Claims, 3 Drawing Sheets

METHOD OF CAPTURING MERCAPTANS CONTAINED IN A NATURAL GAS BY CONCENTRATION

FIELD OF THE INVENTION

The present invention relates to a method of capturing and removing mercaptans present in a natural gas.

BACKGROUND OF THE INVENTION

Prior to being marketed, natural gas is subjected to three main operations: deacidizing, dehydration and gasoline extraction.

The purpose of the deacidizing operation is to remove the acid compounds such as carbon dioxide ($CO_2$), hydrogen sulfide ($H_2S$), carbonyl sulfide (COS) and mercaptans, mainly methylmercaptan, ethylmercaptan and propylmercaptans. The specifications generally allowed for deacidized gas are 2% $CO_2$, 4 ppm $H_2S$ and 20 to 50 ppm total sulfur content.

The dehydration operation then allows to control the water content of the deacidized gas in relation to transport specifications.

Finally, the gasoline extraction operation allows to guarantee the hydrocarbon dew point of the natural gas, also according to transport specifications.

The deacidizing operation, which is essentially intended to reduce the $CO_2$ and $H_2S$ content of the gas, is for example performed by means of an absorption method, using notably chemical solvents like, for example, alkanolamines such as diethanolamine (DEA) or methyldiethanolamine (MDEA). After this treatment, the gas meets the specifications relative to the $CO_2$ content, typically below 2% by mole, and to the $H_2S$ content, typically 4 ppm by mole. Part of the light mercaptans, notably methylmercaptan, is removed during this operation. The heavier mercaptans such as ethyl, propyl and butylmercaptan, or containing more than four carbon atoms, are not soluble enough in an aqueous solution or acid enough to significantly react with the alkanolamines generally used for deacidizing, and a great proportion thereof therefore remains in the gas. Most of these acid compound absorption methods have a mercaptan extraction efficiency ranging between 40% and 60%. Some technical solutions using solvents with a high physical absorption capacity such as water-alkanolamine-sulfolane mixtures, which achieve 90% sulfur compound elimination but with a significant energy consumption, notably because of the high solvent flow rates required by such performances, can however be mentioned.

Methods only based on the use of a solvent characterized by a high acid compound physical absorption capacity would allow removal of the mercaptans. They are however often unsuited to the constraints involved for $CO_2$ and $H_2S$ removal. The absorption capacity of these physical solvents is proportional to the partial pressure of the contaminants to be removed from the gaseous effluent. High flow rates and a costly solvent regeneration are then required for specifications to be met. Furthermore, these methods entail a risk of accumulation, in the solvent, of long carbon chain mercaptans, i.e. having more than three carbon atoms, notably because of the boiling point of these sulfur compounds that is sometimes higher than the boiling point of the physical solvent selected.

The dehydration operation can be carried out by means of a glycol process (for example the process described in document FR-2,740,468), using notably TEG, which allows to lower the water content of the gas down to a value close to 60 ppm by mole. The mercaptans are not eliminated in this stage. An adsorption method of T.S.A. (Thermal Swing Adsorption) type on molecular sieve, for example of 3A or 4A or 13X type, or on silica gel or alumina, can also be used. In this case, the water content of the gas is typically below 1 ppm by mole.

A last fractionation operation by cooling finally allows the treated gas to be separated into its different constituents so as to valorize each cut produced: C1 cut, C2 cut, or C1+C2 cut, C3 cut, C4 cut, and heavier C5+ cut, possibly further separated into various complementary fractions. The major part of the sulfur compounds is concentrated in the liquid phases, which therefore have to be processed later to meet the sulfur specifications generally required.

It is therefore necessary to carry out one or more additional processing stages, depending on the distribution of the mercaptans in the various cuts obtained after fractionation. According to the technology selected, this mercaptan removal stage takes place at various points of the natural gas processing chain.

Generally, the mercaptans are removed by caustic washing of the liquid hydrocarbon cuts obtained from fractionating. Countercurrent contacting, in a plate column, of the hydrocarbon feed with a concentrated soda solution, between 10% and 20% by weight, provides elimination of all the sulfur compounds such as COS and the mercaptans. The mercaptans react with the soda and give mercaptides, which are then oxidized in the presence of a catalyst present in the solvent and give disulfides, while regenerating the caustic solution. The latter are then separated by decantation of the aqueous phase. The efficiency of this technique is furthermore closely linked with the nature of the mercaptans to be removed: it decreases as the number of carbon atoms of the hydrocarbon chain of the mercaptan increases. This can be explained by the low solubility in an aqueous solution of mercaptans having more than three carbon atoms. Furthermore, the presence of COS reacting irreversibly with soda leads to a high base consumption.

An alternative to the caustic washing technique is elimination of the mercaptans upstream from the fractionation stage. This complementary treatment intended to lower the residual mercaptan content can consist of an adsorption stage using for example a 13X zeolite for desulfurization, the pore size of these zeolites allowing complete adsorption of all the mercaptans, including the biggest ones. The methods used are then T.S.A. (Thermal Swing Adsorption) type processes wherein adsorption takes place at ambient or moderate temperature, typically ranging between 20° C. and 60° C., and desorption at high temperature, typically between 200° C. and 350° C., under sweeping of a regeneration gas, which can notably be part of the purified gas, generally between 5% and 20% of the flow of feed gas. The regeneration gas is preferably recycled upstream from the glycol dehydration plant or upstream from the adsorption purification units. The pressure is either maintained substantially constant throughout the cycle, or lowered during the regeneration stage so as to favour regeneration. At the outlet of this adsorption purification stage, the gas meets the total sulfur specifications.

The regeneration gas containing a large amount of mercaptans must however be treated prior to being recycled, for example by washing with a basic solution (soda or potash), with known limitations due to the low solubility of mercaptans in an aqueous solution. One drawback of these adsorption sieves lies in the production of a mercaptan-rich gaseous effluent which also has to be processed. Current techniques for removing mercaptans from a gaseous effluent are often ineffective or economically unsuitable.

The present invention provides a new technique for removing the mercaptans contained in a natural gas. In general terms, the mercaptan-laden natural gas is contacted with a mercaptan-adsorbing sieve. The mercaptan-rich gaseous effluent obtained upon regeneration of the sieve is then contacted with an olefin-containing liquid feed in the presence of an acid catalyst. Under suitable conditions, the mercaptans are absorbed in the liquid feed and react with the olefins so as to form sulfides soluble in the solvent. A solvent regeneration stage allows the capture agent to be recycled.

SUMMARY OF THE INVENTION

In general terms, the invention relates to a method of capturing mercaptans contained in a natural gas, wherein the following stages are carried out:

a) circulating the natural gas through a molecular sieve adsorbing part of the mercaptans contained in the natural gas so as to obtain a mercaptan-depleted natural gas and a mercaptan-laden molecular sieve, b) circulating a purge gas through the mercaptan-laden molecular sieve obtained in stage a) so as to desorb the mercaptans from the sieve and to obtain a mercaptan-enriched purge gas, and c) contacting the mercaptan-enriched purge gas obtained in stage b) with a solvent comprising olefins and an acid catalyst so that the mercaptans are absorbed by the solvent and react with the olefins contained in the solvent so as to form sulfides, then discharging the mercaptan-depleted purge gas.

According to the invention, the solvent can be contacted with the mercaptan-enriched purge gas at a relative pressure ranging between 1 bar and 200 bars, and at a temperature ranging between 0° C. and 200° C.

The catalyst can comprise at least one of the following compounds: phosphoric acid, sulfuric acid, boric acid, sulfonic acid, nitric acid, carboxylic acid, a faujasite, a mordenite, a zeolite, a resin, a fluorinated alumina, a chlorinated alumina, a natural clay, a synthetic clay.

The solvent can comprise between 0.001% and 100% olefins comprising three to twenty carbon atoms. The solvent can further comprise hydrocarbons with more than eight carbon atoms.

The sulfide-laden solvent can be discharged.

According to the invention, the sulfide-laden solvent can be expanded so as to release elements co-absorbed upon contacting of the mercaptan-enriched purge gas with the solvent.

The sulfide-laden solvent can be distilled so as to release elements co-absorbed upon contacting of the mercaptan-enriched purge gas with the solvent.

The sulfide-laden solvent can be incinerated. The sulfide-laden solvent can also be regenerated by cracking, the solvent being contacted, at a temperature above 100° C., with an acid catalyst, then at least part of the regenerated solvent is recycled by contacting with the mercaptan-enriched purge gas.

The molecular sieve can be a 13X type zeolite.

The purge gas can consist of part of the mercaptan-depleted natural gas obtained in stage a), of nitrogen, hydrogen or argon.

Prior to stage a), the natural gas can be deacidized by contacting with an absorbent solution, then dehydrated. The mercaptan-depleted natural gas obtained in stage a) can be subjected to gasoline extraction and fractionation.

BRIEF DESCRIPTION OF THE FIGURES

Other features and advantages of the invention will be clear from reading the description hereafter, with reference to the accompanying figures wherein.

DETAILED DESCRIPTION

Figure 1:
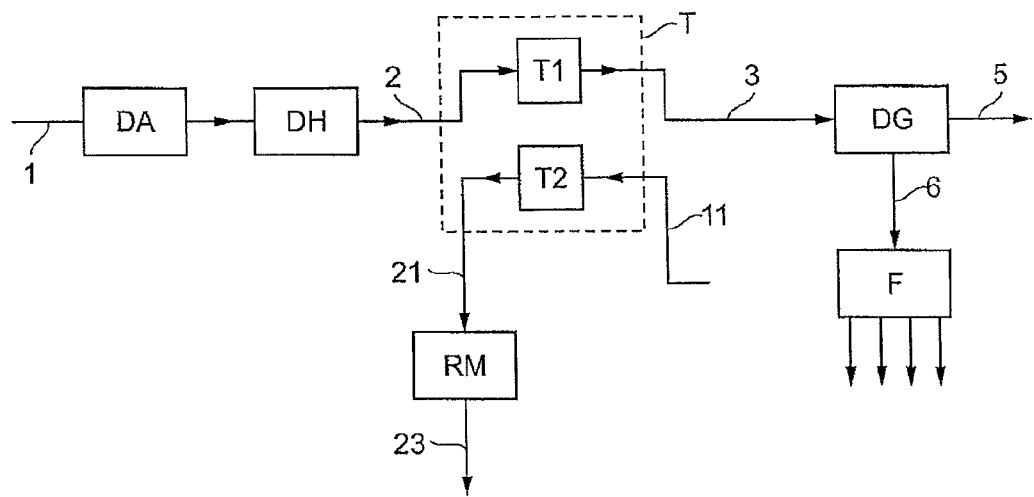
FIGS. 1 and 2 diagrammatically show the method according to the invention.

In FIG. 1, the natural gas to be processed flows in through line 1. It can directly come from a drilling site. The natural gas can comprise hydrocarbons having between one and ten carbon atoms, preferably between one and five carbon atoms.

The unprocessed natural gas can flow through line 1 into deacidizing unit DA. The deacidized natural gas discharged from DA is depleted in acid compounds such as $H_2S$ and $CO_2$, it however comprises a significant amount of mercaptans that have to be removed so as to allow marketing of the natural gas.

Then, the natural gas can be dehydrated in dehydration unit DH. Dehydration can be carried out by means of an absorption stage using a glycol solution, possibly completed by an adsorption stage using adsorption sieves, 3A sieves for example. Alternatively, it is possible to dehydrate the gas only by water adsorption on a molecular sieve. The gas discharged from unit DH through line 2 can have a water content below 1 ppm by mole.

According to another option, the dehydration unit can be arranged downstream from unit T. Alternatively, dehydration of the gas can be carried out through water adsorption by the sieves of unit T. In this case, unit DH is not necessary.

The gas, possibly deacidized and dehydrated, circulating in line 2 is fed into processing unit T implementing a stage of adsorption of the mercaptans contained in the gas. Adsorption unit T uses molecular sieves T1 and T2 that work alternately according to the methods commonly referred to as T.S.A. (Thermal Swing Adsorption). Sieves T1 and T2 comprise a mercaptan-adsorbing solid, for example a 13X zeolite, the pore size of these zeolites allowing selective mercaptan adsorption. Sieves T1 and T2 work alternately in adsorption mode, then in regeneration mode. In FIG. 1, sieve T1 works in adsorption mode and sieve T2 works in regeneration mode. The gas flowing in through line 2 is contacted with molecular sieve T1. As the gas passes through sieve T1, the mercaptans contained in the gas are adsorbed by the sieve. Adsorption takes place at ambient or moderate temperature, typically ranging between 20° C. and 60° C., and at a pressure ranging between 10 and 100 bars for example. The natural gas discharged from sieve T1 through line 3 is depleted in mercaptans. Sieve T2 comprises mercaptans that have been adsorbed during a previous adsorption stage. Sieve T2 is regenerated by contacting with a purge gas flowing in through line 11. Regeneration, or desorption, takes place at high temperature, typically ranging between 200° C. and 350° C., and at a pressure ranging between 10 and 100 bars. The purge gas allows the mercaptans to be desorbed and driven out of sieve T2. The purge gas flowing from sieve T2 through line 21 is laden with mercaptans. The purge gas can consist of part of the purified natural gas circulating in line 3, generally between 5% and 20% of the natural gas flowing in through line 2. The purge gas can also consist of part of the methane or of the ethane or of a mixture of methane and ethane obtained after fractionation. The purge gas can also be another gas, for example nitrogen, hydrogen, argon. When sieve T1 is saturated with mercaptans, sieves T1 and T2 are inverted, sieve T2 being used to capture the mercaptans contained in the natural gas circulating in line 2 and sieve T1 being regenerated by the purge gas flowing in through line 11.

The advantage of T.S.A. type methods as described above is that they allow to obtain a regeneration gas under pressure, ideally at the same pressure as the initial gas feed, i.e. the natural gas circulating in line 2. Furthermore, processing unit T allows to concentrate the mercaptans from the natural gas in the gas purge. In fact, the mercaptans can be at a concentration that can reach 1%, generally ranging between 20 and 2000 ppm, in the natural gas circulating in line 2. After adsorption in unit T, these mercaptans are discharged into the purge gas through line 21, the mercaptan concentration in the purge gas can be multiplied by 100 in relation to the concentration of the feed circulating in line 2, generally by 20, with conventional sieve regeneration techniques.

The regeneration effect is essentially based on the mercaptan adsorption capacity variation on sieves T1 and T2. The temperature, associated with the stripping effect by the regeneration gas, remains the key parameter of this adsorption capacity variation. Other sieve regeneration modes based on the adsorption selectivity competition between various species or based on the adsorption capacity variation under the effect of pressure can be used to regenerate sieves T1 and T2 and to obtain a mercaptan-rich gaseous effluent.

The purge gas circulating in line 21 and containing a large amount of mercaptans then has to be treated prior to being recycled. Current techniques providing soda abatement or washing of the gaseous effluent by a solvent allowing physical adsorption of the mercaptans are greatly penalized by the operating cost involved: soda consumption, low solubility in an aqueous solution of the mercaptans having more than three carbon atoms, regeneration of a physical solvent generally having a low absorption capacity, loss of hydrocarbons co-absorbed in the physical solvent possibly used.

According to the invention, the mercaptan-laden purge gas circulating in line 21 is fed into processing unit RM that allows the mercaptans to be separated from the purge gas. The treatment carried out in unit RM is described hereafter in connection with FIG. 2. The purge gas discharged from unit RM through line 23 is depleted in mercaptans. This purge gas can be recycled upstream from unit T by being mixed with the gas circulating in line 1 or 2, or it can be used for regeneration of the sieves by being fed into line 11 again.

The natural gas coming from processing unit T through line 3 is then subjected to gasoline extraction in unit DG. The methane and possibly ethane cuts are discharged through line 5. The hydrocarbons heavier than methane are discharged from unit DG through line 6 and fractionated in unit F into various valorizable hydrocarbon cuts, for example a propane cut, a butane cut and a cut comprising the pentanes and the heavier hydrocarbons.

Figure 2:
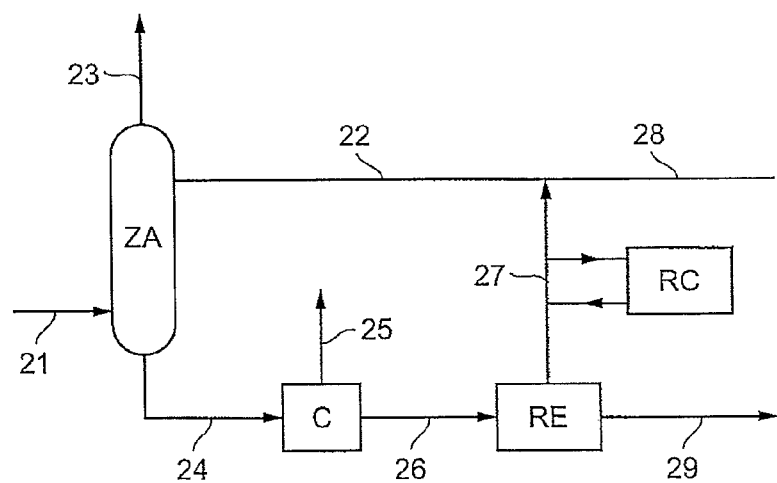

In connection with FIG. 2 showing in detail the operations performed in processing unit RM, the gaseous feed flowing in through line 21 is contacted in contacting zone ZA with a liquid solvent flowing in through line 22. The solvent comprises between 0.001% and 100% by weight of a liquid olefin having between three and twenty carbon atoms, preferably between five and fifteen carbon atoms. Contacting in zone ZA is carried out in the presence of an acid catalyst.

In zone ZA, the gaseous mercaptans are absorbed by the liquid solvent and react with the olefins in the presence of the acid catalyst so as to form a sulfide.

The chemical reaction carried out in zone ZA is:

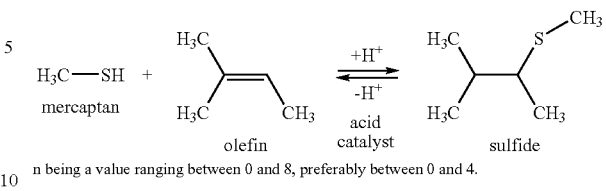

n being a value ranging between 0 and 8, preferably between 0 and 4.

This addition reaction is not modified by the length of the alkyl chain of the mercaptan or the number of carbon atoms of the hydrocarbon chain of the olefin.

The sulfides formed solubilize in the liquid solvent, under suitable operating conditions. For example, according to the reaction described above, at atmospheric pressure, the methylmercaptan whose boiling point is 6.2° C. adds to methyl-2-butene-2 (boiling point 38.6° C.) so as to form a sulfide whose boiling point ranges between 130° C. and 140° C.

One advantage of the present invention lies in the fact that the chemical reaction between the mercaptans and the olefin contained in the solvent gives the solvent a high absorption capacity. It allows to minimize the solvent flow rate required for mercaptan extraction while providing optimum hydraulics for the gas-liquid contact.

The mercaptan concentration in the purge gas allows to optimize the addition reaction of the mercaptans with the olefins. In fact, the stream transferred from the gas phase to the solvent is for the most part conditioned by the mercaptan partial pressure in the feed.

The purified gaseous feed, i.e. comprising no or few mercaptans, is discharged from zone ZA through line 23. The solvent laden with reaction product, i.e. sulfide, is discharged through line 24.

Gas-liquid contact between the mercaptan-laden gaseous effluent and the olefin-containing liquid solvent, in the presence of a catalyst, simultaneously guarantees absorption of the mercaptan by the solvent and its reaction with the olefin present in this solvent. During contact, the mercaptans present in the gaseous feed solubilize in the solvent. The solubility of the mercaptan increases with its molecular mass, which allows to ensure elimination of the mercaptans comprising more than two carbon atoms, that are generally difficult to remove by means of the conventional caustic washing techniques used for processing liquid cuts from natural gas fractionation. The chemical reaction between the mercaptans and the olefin present in the solvent displaces the solubility equilibrium so as to absorb and to cause all the mercaptans present in the gaseous effluent to be desulfurized to react.

The presence of acid compounds in the gaseous effluent flowing in through line 21, such as $H_2S$, $CO_2$ or COS, does not penalize the method according to the invention. The $H_2S$, like the mercaptans present in the gaseous effluent, is absorbed by the solvent and reacts with the olefin so as to form mercaptans that in turn react with a second olefin molecule and form sulfides.

The acid catalyst allows to promote the addition reaction performed in zone ZA. The acid catalyst can consist of phosphoric, sulfuric, boric, sulfonic, nitric acids. These acids can come in liquid form in the aqueous phase or in form of ionic liquids or of molten salts. These acids can be supported on solid supports made of silica, alumina, or silica-alumina, or any other solid support. Acid catalysts such as resins, natural or synthetic zeolites can also be used for implementing the present invention. By way of example, faujasites, mordenites, zeolites, X and Y for example, can be mentioned. Other acid solids can be used, such as fluorinated or chlorinated aluminas, natural or synthetic clays. Any catalyst form can be used for implementing the invention.

The acid catalyst can be in solution in the liquid solvent. The catalyst in solid form can be fixed to gas-liquid distribution elements of zone ZA (distribution plates, column packing) or it can be used as packing itself.

In zone ZA, gas-liquid contact is achieved under the thermodynamic conditions under which the gaseous effluent is available. Gas-liquid contacting can be performed at a pressure ranging between 10 and 100 bars, and at a temperature ranging between 0° C. and 100° C., preferably between 20° C. and 60° C.

The olefins making up the liquid solvent comprise at least three carbon atoms. In order to limit losses by entrainment in the gaseous effluent, the olefins preferably have more than five carbon atoms, ideally more than eight. The olefins can be linear or branched. These olefins preferably have a single double bond. However, diolefins can be used if necessary rather than olefins. These olefins can be used pure, in admixture or diluted in a mixture of hydrocarbons having at least eight carbon atoms. Preferably, these hydrocarbons and the olefin used have a carbon chain of equal length, and the standard boiling-point temperatures of the former do not differ by more than 30° C. from that of the olefin.

The solvent flowing in through line 22 can come from processing and regeneration unit RE through line 27 and/or from an olefin reserve through line 28.

Contact between the catalyst, the gaseous feed to be processed and the liquid solvent can be achieved in many ways.

Figure 3:
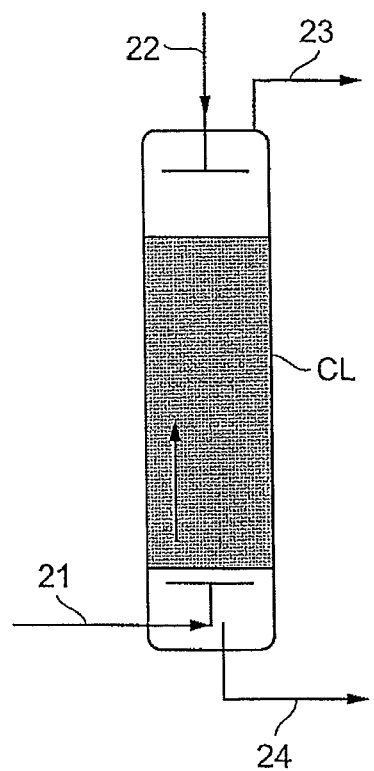
FIG. 3 diagrammatically shows a gas-liquid contactor.

Zone ZA can be a gas-liquid contactor of washing column CL type as shown in FIG. 3. In column CL of FIG. 3, the gaseous feed flowing in through line 21 circulates countercurrent to the olefin-containing solvent flowing in through line 22. The acid catalyst can be in solution in the solvent or fixed in solid form to elements interior to column CL. The purified gaseous feed is discharged through line 23. The sulfide produced by the addition reaction between the mercaptans and the olefins is discharged from column CL through line 24. Column CL can also work in cocurrent mode, i.e. the liquid and the gas in contact circulate cocurrent to one another. In this case, the effluent from the column is fed into a gas-liquid separating drum to separate the purified gaseous feed from the liquid solvent.

Contacting in zone ZA can be carried out by means of any other equipment or technique known to the man skilled in the art. Various known plate or packing geometries can be used. The contacting methods and the catalytic packings generally used in reactive distillation operations are suited to the invention. By way of example, it is possible to use the Multipak or Katapak type catalytic packings described in the document "Catalysis Today", 2001, 69, p. 75. Alternatively, it is also possible to use monolith packings insofar as the flow rates of the phases to be contacted can be adjusted in order to reach in the channels the Taylor flow regime for which transfer of the mercaptans from the gas phase to be processed to the solvent is optimized.

The method allows to convert mercaptans (gaseous and toxic compounds) to sulfides (non-toxic liquid compounds). The used solvent thus obtained through line 24 can be processed in different ways according to the production site availabilities. If the size of the site (offshore platform) does not allow processing on the spot, the solvent can be readily transported to a reprocessing site.

In FIG. 2, the used solvent discharged through line 24 can be subjected in unit C to a prior operation in order to release the elements possibly co-absorbed in zone ZA. Unit C performs expansion of the solvent, for example through an expansion valve or turbine. In place of or in addition to expansion, the used solvent can be subjected to distillation. The pressure decrease and distillation are achieved so as to release the various elements co-absorbed in the solvent upon contacting in zone ZA. The goal is notably to release the hydrocarbons with less than three carbon atoms. The elements released in gaseous form in unit C are discharged through line 25.

For example, expansion is carried out in one or two flash drums, at pressures ranging between 10 bars and 70 bars.

Figure 4:
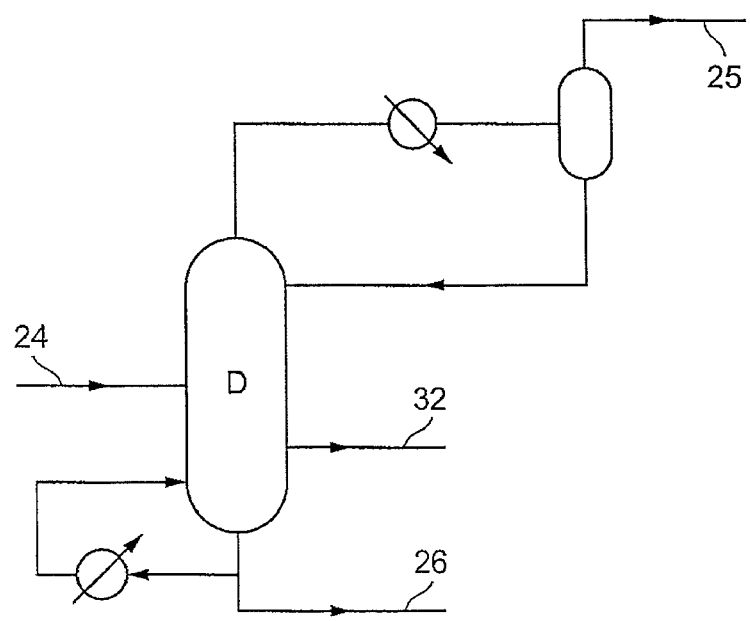
FIG. 4 diagrammatically shows a distillation device.

Distillation can possibly allow to concentrate at the column bottom the sulfides whose boiling-point temperature is higher than that of the other constituents of the used solvent. Distillation can be performed according to the process diagrammatically shown in FIG. 4. The used solvent flowing in through line 24 (this solvent may have been first subjected to one or more expansions) is fed into distillation column D. The gaseous fraction discharged at the top of column D is partly condensed to form a reflux introduced at the top of column D, the rest of the gaseous fraction being discharged through line 25. The sulfides concentrated at the bottom of column D are discharged through line 26. At an intermediate level between the bottom and the top of column D, an olefin-rich and sulfide-poor liquid can be separated and discharged through line 32. This liquid can be recycled to zone ZA to be contacted with the gaseous feed flowing in through line 21.

In FIG. 2, the solvent processed in unit C is discharged through line 26 and fed into regeneration or processing zone RE. In zone RE, various techniques can be used for processing or regenerating the used solvent.

For example, in zone RE, the used solvent flowing in through line 26 can be incinerated in refinery heaters. Thus, the sulfides are converted to sulfur oxides which are eliminated from the fumes through various conventional means.

Figure 5:
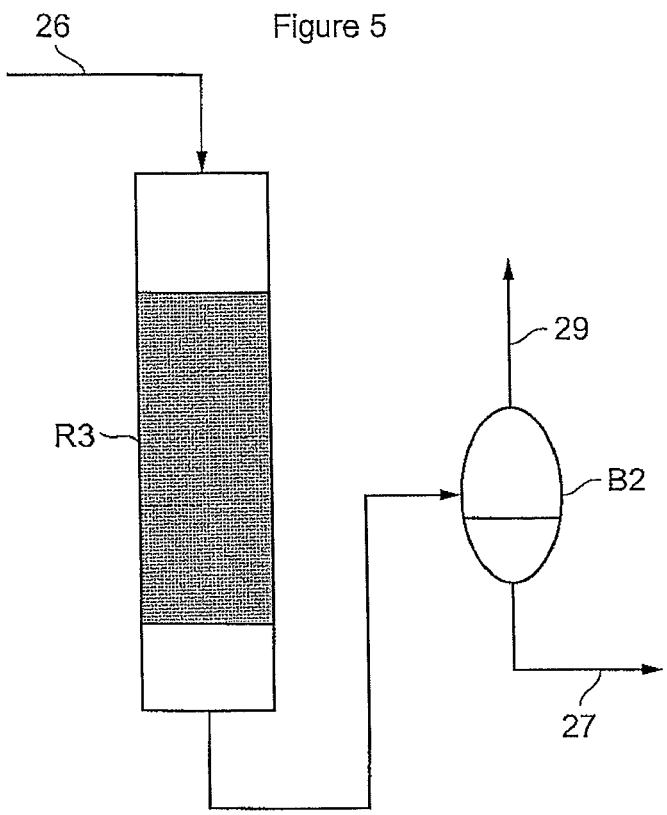
FIGS. 5 and 6 diagrammatically show cracking processes.

Alternatively, a sulfide cracking operation can be performed in zone RE, this operation being diagrammatically shown in FIG. 5.

The used solvent flowing in through line 26 is contacted with an acid catalyst in reactor R3 at high temperature, for example at a temperature above 100° C. Reactor R3 can be heated and/or the used solvent can be heated prior to being fed into reactor R3.

The catalyst can consist of phosphoric, sulfuric, boric, sulfonic, nitric acids. These acids can come in form of ionic liquids or of molten salts. These acids can be supported on solid supports such as silicas, aluminas, or silica-aluminas, or any other solid support. Acid catalysts such as resins, natural or synthetic zeolites can be used. By way of example, faujasites, mordenites, X and Y zeolites can be mentioned. Other acid solids can be used, such as fluorinated or chlorinated aluminas, natural or synthetic clays. The solid catalyst can have any geometrical shape.

The temperature in cracking reactor R3 can range between 100° C. and 500° C., preferably between 120° C. and 400° C., and more preferably between 150° C. and 350° C. The ratio of the volume flow rate of feed flowing in through line 26 to the volume of catalyst in reactor R3 ranges between 0.01 $m^3/m^3/h$ and 20 $m^3/m^3/h$, preferably between 0.1 $m^3/m^3/h$ and 10 $m^3/m^3/h$. The pressure in reactor R3 is so adjusted that the feed is at the minimum 60% in the liquid phase at the catalytic zone inlet, and preferably 90% in the liquid phase.

The cracking operation generates two fractions that are separated in drum B2:
  a gaseous fraction containing all the mercaptans initially present in the natural gas. These mercaptans discharged through line 29 can be burnt with part of the gases in the furnaces of the site and converted to sulfur oxides, or processed in a Claus plant, a liquid fraction consisting of the solvent comprising the regenerated olefin that can be recycled to the mercaptan removal unit through lines 27 and 22.

Figure 6:
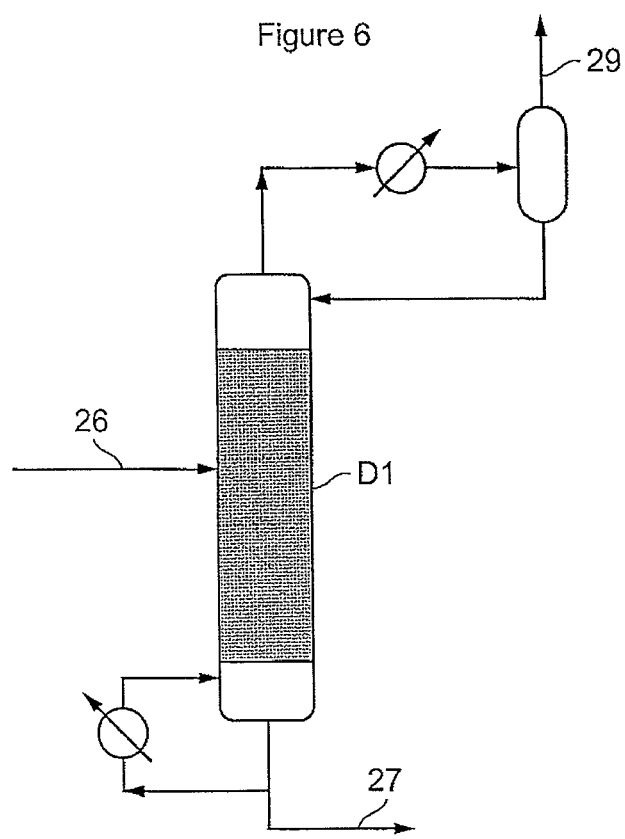

The cracking operation in zone RE can also be carried out by means of a distillation operation diagrammatically shown in FIG. 6. The used solvent flowing in through line 26 is fed into distillation column D1, in the presence of the acid catalyst. The catalyst can be fed into column D1 with the solvent through line 26. The catalyst can also be fixed in solid form to elements interior to column D1. The reaction between the olefin and the mercaptans being governed by a thermodynamic equilibrium, high-temperature distillation, between 100° C. and 200° C., ideally between 120° C. and 140° C., allows to regenerate the olefin and to reform the mercaptan. The olefin in liquid phase is recovered at the bottom of distillation column D1 through line 27 then, possibly after cooling, it is sent back through line 22 to contacting zone ZA. The mercaptans and possibly the $H_2S$ co-absorbed in the absorption stage are discharged in the gas phase at the top of column D1 through line 29. In order to facilitate extraction of the mercaptans, an entrainment commonly referred to as stripping can be achieved by feeding an inert gas, or possibly with part of the processed natural gas, into column D1. This stripping gas can be obtained upon desorption of the compounds co-absorbed in unit C.

During the regeneration stage as described above, contacting the olefin-rich solvent with a catalyst of acid nature at high temperature can lead to an olefin loss due to an oligomerization reaction of these compounds. The olefin fraction lost by oligomerization depends on the temperature conditions in the cracking section, on the nature of the catalyst and on the residence time of the olefins in this section and therefore on the technology selected for this section.

These oligomers are characterized by a higher boiling point than the other solvent compounds, mainly the olefins intended to capture the mercaptans or the sulfides formed during the reaction in section ZA or possibly the hydrocarbons co-absorbed in ZA if section C is not used.

Separation of these oligomer compounds can be carried out by distillation of the effluent from regeneration section RE. The operation carried out in unit RC can concern all of the solvent recycled through line 27. It is preferably performed on a fraction of the stream collected in line 27.

During distillation, the compounds resulting from the oligomerization reactions and the sulfides that have not been cracked in RE concentrate in the bottom of the distillation column. The olefin-containing solvent is collected at the top of the column and it is recycled to section ZA. The temperature and pressure conditions in this column are conditioned by the nature of the solvent and of the olefin used in the process.

The numerical example hereafter illustrates the invention described in connection with FIG. 1.

The natural gas circulates in line 1 at a flow rate of 1000 kmol/h and at a pressure of 80 bars. This gas essentially consists of methane and it contains 5% by volume $H_2S$ and 1% by volume mercaptans distributed between methyl-mercaptan, ethyl-mercaptan and propyl-mercaptan.

The natural gas is deacidized in unit DA by contacting with an aqueous alkanolamine solution in order to remove the $H_2S$.

To capture the mercaptans, the deacidized gas from DA would have to be contacted with about 10 t/h solvent having an equimolar proportion of C12+ olefin and alkane. Furthermore, the heaviest hydrocarbons, i.e. C5+, involve a risk of co-absorption in the solvent.

According to the invention, carrying out a mercaptan concentration stage by means of the adsorption sieves of unit T allows to concentrate the mercaptans in the gaseous feed circulating in line 21, i.e. the regeneration gas of the sieve. Despite the pressure drop facilitating regeneration of the sieves, elimination of all of the mercaptans concentrated in a gas representing about 10% of the natural feed gas, and available at a pressure of 50 bars, requires no more than 1.5 t/h solvent having an equimolar proportion of C12+ olefin and alkane. Furthermore, the regeneration gas essentially consisting of light hydrocarbons (methane, ethane) allows to minimize the co-absorption of hydrocarbons in the solvent made up of olefin and alkane.

The invention claimed is:

1. A method of capturing mercaptans contained in a natural gas, wherein the following stages are carried out:
   a) circulating the natural gas through a molecular sieve adsorbing part of the mercaptans contained in the natural gas so as to obtain a mercaptan-depleted natural gas and a mercaptan-laden molecular sieve,
   b) circulating a purge gas through the mercaptan-laden molecular sieve obtained in stage a) so as to desorb the mercaptans from the sieve and to obtain a mercaptan-enriched purge gas, and
   c) contacting the mercaptan-enriched purge gas obtained in stage b) with a liquid solvent comprising olefins and an acid catalyst so that the mercaptans are absorbed by the liquid solvent and react with the olefins contained in the solvent so as to form sulfides, then discharging the mercaptan-depleted purge gas.

2. A method as claimed in claim 1, wherein the liquid solvent is contacted with the mercaptan-enriched purge gas at a relative pressure ranging between 1 bar and 200 bars, and at a temperature ranging between 0° C. and 200° C.

3. A method as claimed in claim 1, wherein the acid catalyst comprises at least one of the following compounds: phosphoric acid, sulfuric acid, boric acid, sulfonic acid, nitric acid, carboxylic acid, a faujasite, a mordenite, a zeolite, a resin, a fluorinated alumina, a chlorinated alumina, a natural clay, and a synthetic clay.

4. A method as claimed in any claim 1, wherein the molecular sieve is a 13X type zeolite.

5. A method as claimed in claim 1, wherein the purge gas consists of part of the mercaptan-depleted natural gas obtained in stage a).

6. A method as claimed in claim 1, wherein prior to stage a), the natural gas is deacidized by contacting with an absorbent solution, then dehydrated.

7. A method as claimed in claim 1, wherein the mercaptan-depleted natural gas obtained in stage a) is subjected to gasoline extraction and fractionation.

8. A method as claimed in claim 1, wherein the liquid solvent comprises between 0.001 % and 100 % olefins having three to twenty carbon atoms.

9. A method as claimed in claim 8, wherein the liquid solvent further comprises hydrocarbons having more than eight carbon atoms.

10. A method as claimed in claim 1, wherein the sulfides are solubilized in the liuid solvent to form a sulfide-laden solvent, and the sulfide-laden solvent is discharged.

11. A method as claimed in claim 10, wherein the sulfide-laden solvent is expanded so as to release elements co-absorbed during contacting of the mercaptan-enriched purge gas with the liquid solvent.

12. A method as claimed in claim 10, wherein the sulfide-laden solvent is distilled so as to release elements co-absorbed during contacting of the mercaptan-enriched purge gas with the liquid solvent.

13. A method as claimed in claim 10, wherein the sulfide-laden solvent is incinerated.

14. A method as claimed in claim 10, wherein the sulfide-laden solvent is regenerated by cracking, the sulfide-laden solvent being contacted, at a temperature above 100° C., with an acid catalyst to form a regenerated solvent, then at least part of the regenerated solvent is recycled by being contacted with the mercaptan-enriched purge gas.

* * * * *